United States Patent
Wiant et al.

(10) Patent No.: US 6,870,103 B1
(45) Date of Patent: Mar. 22, 2005

(54) BUS JOINT COVER ASSEMBLY

(75) Inventors: Jason P. Wiant, Bedford, TX (US); Harry W. Josten, Grapevine, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 12 days.

(21) Appl. No.: 10/656,816

(22) Filed: Sep. 5, 2003

(51) Int. Cl.[7] .............................. H01R 4/60; H02G 5/00
(52) U.S. Cl. .................. 174/68.2; 174/70 B; 174/88 B; 361/605; 361/611; 439/213
(58) Field of Search ................. 174/68.2, 68.3, 174/70 B, 71 B, 72 B, 88 B, 99 B, 129 B, 133 B, 149 B; 361/600, 601, 605, 609, 611, 614, 615, 621, 624, 627–632, 637–649, 667, 673, 675; 439/213

(56) References Cited

U.S. PATENT DOCUMENTS

| | | | | |
|---|---|---|---|---|
| 2,950,456 A | * | 8/1960 | Rehder ...................... 439/213 |
| 3,315,132 A | * | 4/1967 | Lucas ........................ 174/72 B |
| 4,030,794 A | * | 6/1977 | Rozenboom et al. ....... 439/213 |
| 4,097,103 A | * | 6/1978 | Krause ....................... 439/213 |
| 4,105,136 A | | 8/1978 | May ............................ 220/339 |
| 4,307,304 A | * | 12/1981 | Kovatch et al. ........... 174/71 B |
| 4,419,715 A | * | 12/1983 | Pear ............................ 361/638 |
| 4,658,504 A | | 4/1987 | Sinharoy et al. ............... 29/873 |
| 4,849,581 A | * | 7/1989 | Larkin et al. ............. 174/88 B |
| 4,886,940 A | * | 12/1989 | Gagnon et al. ........... 174/88 B |
| 4,912,599 A | * | 3/1990 | Wittmer ...................... 361/675 |
| 4,979,906 A | * | 12/1990 | Shrout et al. ............... 439/213 |
| 5,011,421 A | * | 4/1991 | Duke et al. ................. 439/213 |
| 5,364,203 A | * | 11/1994 | Ishikawa .................... 174/71 B |
| 5,941,654 A | * | 8/1999 | Chauquet .................. 174/88 B |
| 6,069,321 A | * | 5/2000 | Wagener et al. ........... 174/99 B |
| 6,100,473 A | * | 8/2000 | Wagener .................... 174/99 R |
| 6,111,745 A | * | 8/2000 | Wilkie et al. ............... 361/605 |
| 6,435,888 B1 | * | 8/2002 | Reed, Jr. ..................... 439/213 |
| 6,489,567 B2 | * | 12/2002 | Zachrai ................... 174/149 B |
| 6,521,837 B2 | * | 2/2003 | Hilgert et al. ............. 174/99 B |
| 6,603,075 B1 | * | 8/2003 | Soares et al. .............. 174/72 B |
| 6,781,818 B2 | * | 8/2004 | Josten et al. ................. 361/611 |

* cited by examiner

Primary Examiner—Dean A. Reichard
Assistant Examiner—Adolfo Nino
(74) Attorney, Agent, or Firm—Foley & Lardner LLP

(57) ABSTRACT

For use in switchgear equipment having bus bars joined together at a bus joint, there is provided a bus joint cover assembly and method. The bus joint cover assembly comprises a collar member having a snap slot. A cap member having a boss snap is configured to engage the snap slot. The cap member is configured to telescopically join with the collar member around the bus joint wherein the bus joint is contained within the bus joint cover assembly. The bus joint cover assembly can include a side cover member configured to position between the collar member and the cap member. The side cover member can be configured to provide a passage for bus bars and can be configured as a bus end cover.

22 Claims, 3 Drawing Sheets

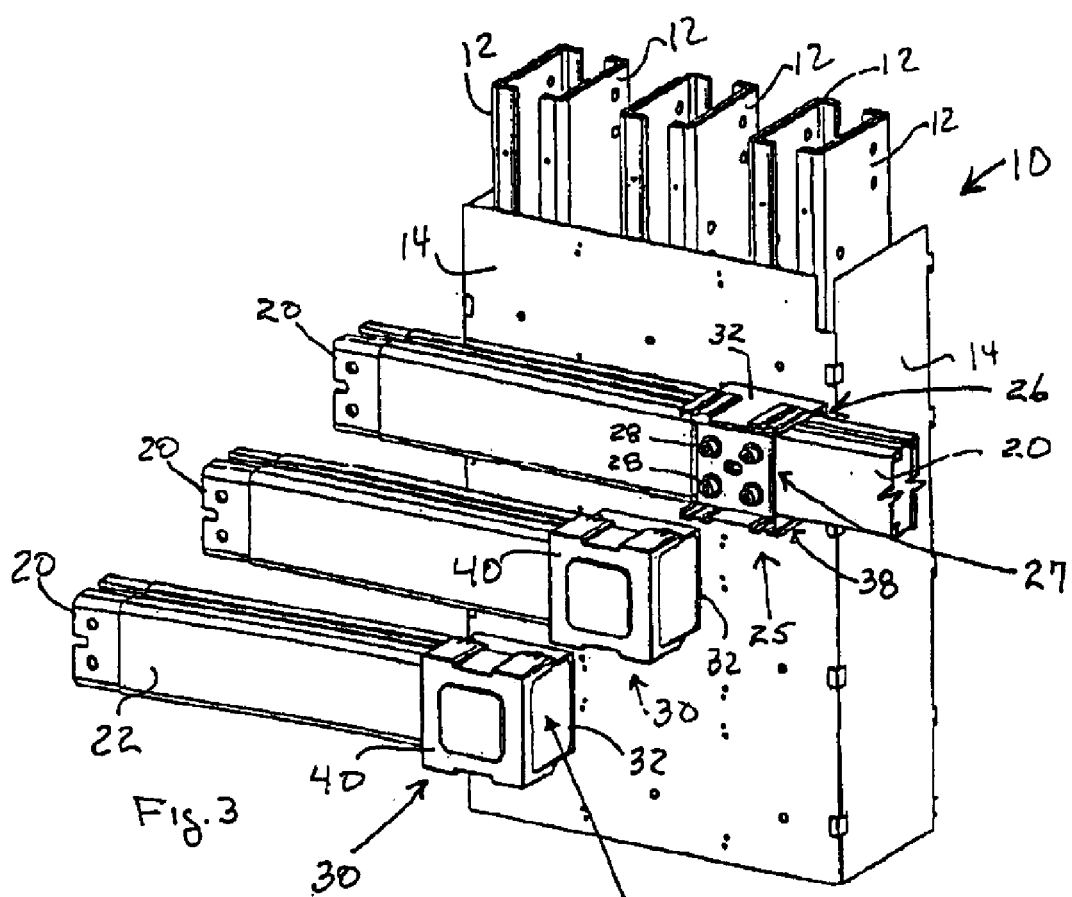
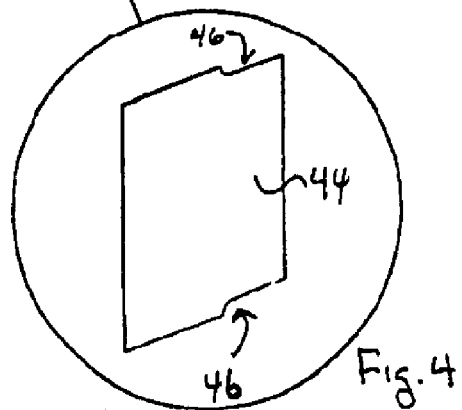

BUS JOINT COVER ASSEMBLY

BACKGROUND

The present invention relates generally to the field of electrical switchboards and panel boards having bus bars, and more particularly to a bus joint cover assembly for use in switchgear and panel board equipment.

Switchgear assemblies, switchboards and panelboards are general terms which cover metal enclosures, housing switching and interrupting devices such as fuses, and circuit breakers, along with associated control, instrumentation and metering devices. Such assemblies typically include associated bus bars, interconnections and supporting structures used for the distribution of electrical power. Low voltage switchgear and switchboards operate at voltages up to 600 volts and with continuous currents up to 5000 amps or higher. Such devices are also designed to withstand short circuit currents ranging up to 200,000 amps (3 phase rms symmetrical).

Typical switchgear equipment is composed of a lineup of several metal enclosed sections. Each section may have several circuit breakers stacked one above the other vertically in the front of the section with each breaker being enclosed in its own metal compartment. Each section has a vertical or section bus which supplies current to the breakers within the section via short horizontal branch buses. The vertical bus bars in each section are supplied with current by a horizontal main bus bar that runs through the lineup of metal enclosed sections. A typical arrangement includes bus bars for each electrical phase of a multiple phase system which may include three power phases and a neutral.

The bus bars typically are joined by bus bar joints in the switchgear panel board line-up. Bus bar joints typically are assembled with bolts that must be accessible for routine maintenance, for example, tightening or replacing bus bars. Bus bar assemblies typically increase in thickness as the current rating of the switchgear equipment increases. It is also typical to provide insulation of various components within a switchgear a panel board enclosure including a cover of the bus bar joints.

Thus, there is a need for a bus bar cover assembly for use in switchgear equipment that will enclose a bus bar joint. There is a further need for a bus joint cover assembly that provides access to fasteners within the bus bar joint. There is an additional need for a bus bar cover assembly that can accommodate various current ratings (sizes) of bus bar joint.

SUMMARY

For use in switchgear equipment having bus bars joined together at a bus joint, there is provided a bus joint cover assembly. The bus joint cover assembly comprises a collar member having a snap slot. A cap member having a boss snap is configured to engage the snap slot. The cap member is configured to telescopically join with the collar member around the bus joint wherein the bus joint is contained within the bus joint cover assembly. Another embodiment of the bus joint cover assembly provides at least one additional snap slot defined in the collar member with the additional snap slot linearly aligned with the other snap slot. The snap boss on the cap member can engage either snap slot thereby allowing the bus joint cover assembly to accommodate various sized bus bars. The bus joint cover assembly can include a side cover member configured to position between the collar member and the cap member, the side cover member can be further configured to provide a passage for bus bars and can be configured as a bus end cover.

Another embodiment provides a bus joint cover assembly for use in switchgear equipment having bus bars joined together in a bus joint. The bus joint cover assembly comprises a collar member, a cap member and a means for telescopically joining the cap member and the collar member around the bus joint wherein the bus joint is contained within the bus joint cover assembly. The bus joint cover assembly can include a side cover member configured to position between the collar member and the cap member, the side cover member can be further configured to provide a passage for bus bars and can be configured as a bus end cover.

There is also provided a method for enclosing a bus bar joint in a switchgear assembly with a bus joint cover assembly. The bus joint has a back side and a front side. The method comprises the steps of providing a collar member, with the collar member having a snap slot. Mounting the collar member on the back side of the bus bar joint. Providing a cap member, with the cap member having a snap boss configured to engage the snap slot. Mounting the cap member on the front side of the bus bar joint. Joining the cap member and collar member by coupling the snap boss to the snap slot wherein the bus bar joint is contained within the bus joint cover assembly. The method can also provide wherein the collar member includes at least one additional snap slot and the step of joining the cap member and collar member includes engaging any snap slot. Another embodiment includes the steps of providing a side cover member and positioning the side cover member between the collar member and cap member. Another embodiment includes the step of selecting material for the bus joint cover assembly and may include selecting an electrically insulating material from one of a thermoset and thermoplastic material.

BRIEF DESCRIPTION OF THE DRAWINGS

FIG. 3 is a perspective view of a partial, multiple phase switchgear equipment assembly illustrating an exemplary embodiment of a bus joint cover assembly with the cap member removed to expose the bus bar joint and bus bar joint fasteners.

FIG. 4 is a detailed view of a side cover member of the bus joint cover assembly illustrated in FIG. 3.

DETAILED DESCRIPTION OF THE EXEMPLARY EMBODIMENTS

Before describing exemplary embodiments of a bus joint cover assembly 30, several comments are appropriate. Switchgear assemblies and panel board assemblies typically include vertical (section) bus bar and horizontal bus bars to distribute power within the assemblies. Bus bars can be flat and have a rectangular cross-section or bus bars can be C-shaped or U-shaped channels.

A C-shaped or U-shaped channel bus resists bending and twisting in short-circuit current conditions and is stronger than a flat bar of comparable thickness. Further, the channel bus assembly can use one or multiple bars per phase thereby increasing the current density available in the system (See FIG. 1). In the multi-channel bus bar system, inner channels are nested inside the outer channels of each phase. Since various configurations of bus bars can be used, a bus bar joint cover assembly that can be configured to accommodate such various configurations will be advantageous. Cost savings should be realized since one joint cover assembly can be used for different bus configurations. A telescoping capability allows the same cover to work with bus bars of varying thickness.

Figure 1:
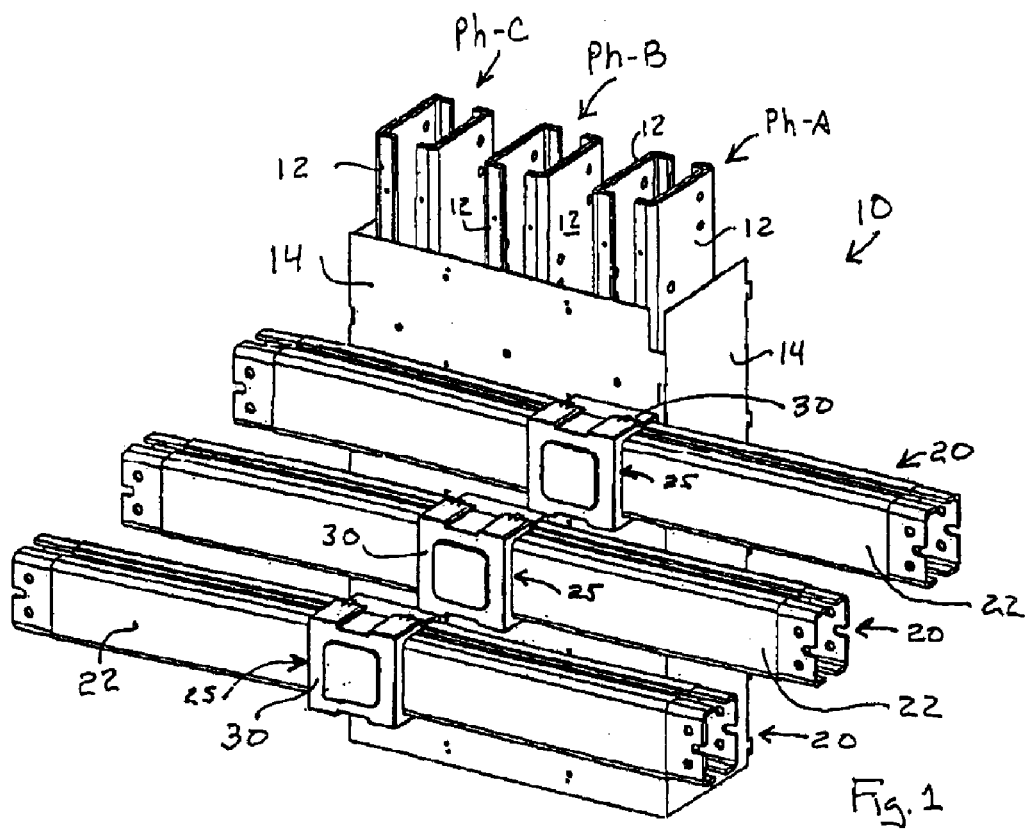
FIG. 1 is a perspective view of a partial, multiple phase switchgear equipment assembly including an exemplary embodiment of a bus joint cover assembly.

Referring now to FIG. 1, there is illustrated a portion of a typical, three phase (PH-A, PH-B, PH-C) high current, insulated switch gear bus assembly 10. The vertical bus bars 12 (also referred to as section bus) are shown with optional insulating barriers 14 installed. The horizontal bus bars 20 are shown with optional insulation sleeves 22 installed. The horizontal bus bar joints 25 are enclosed by a bus joint cover assembly 30.

The bus joint cover assembly 30 for use in the switchgear equipment 10 comprises a collar member 32 and a cap member 40. See FIGS. 2a and 2b. The collar member 32 is provided with a snap slot 34 and the cap member 40 is provided with a snap boss 42 configured to engage the snap slot 34. A guide 38 assembly is provided to facilitate the alignment and engagement of the collar member 32 to the cap member 40 in the bus joint cover assembly 30. The cap member 40 is configured to telescopically join with the collar member 32 around the bus joint 25 wherein the bus joint 25 is contained within the bus joint cover assembly 30.

Figures 2A, 2B:
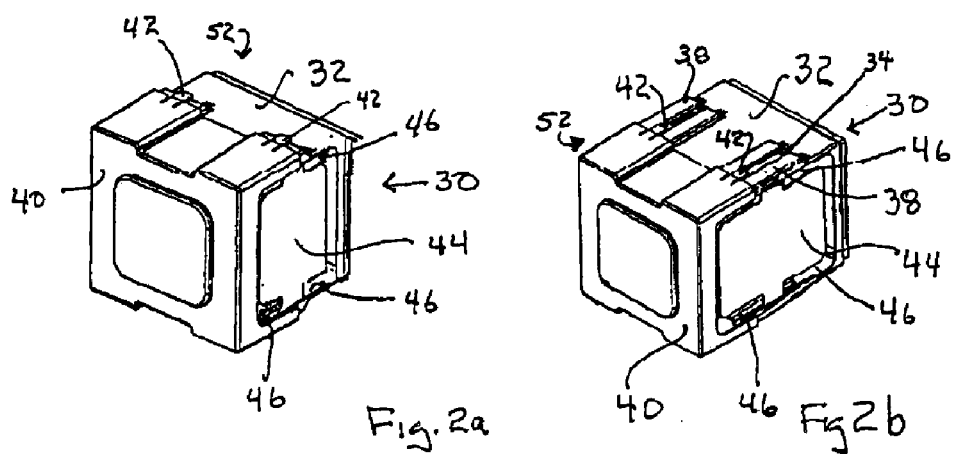
FIG. 2a is a perspective view of an exemplary embodiment of a bus joint cover assembly configured for a medium or low current bus bar.
FIG. 2b is a perspective view of an exemplary embodiment of a bus joint cover assembly configured for a high current bus bar.

A side cover member 44 is configured to be positioned between the collar member 32 and the cap member 40. FIG. 2a illustrates a side member 44 configured for a medium current "narrow" horizontal bus assembly 20. A bus passage 46 is formed in the side cover member 44 to accommodate the horizontal bus bar 20 as shown in FIGS. 1 and 3.

Figure 6:
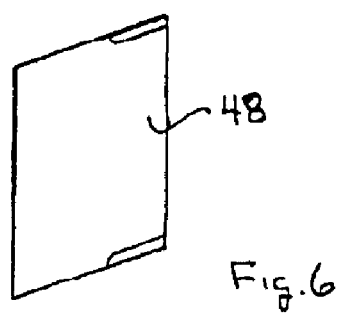
FIG. 6 is a perspective view of an exemplary embodiment of a bus end cover for a bus joint cover assembly.

As mentioned above, bus bars in switchgear equipment 10 can be formed as flat rectangular cross section bars or as U-shaped or C-shaped channels. The channels have small flanges and several channel members can be nested to increase the current density of the bus bars. An example of channel bus bar nests are illustrated in FIGS. 1 and 3 for the vertical bus bars 12. It should be understood that the horizontal bus bars 20 can also be configured as nested channels. Further, as illustrated in FIGS. 1 and 3, the horizontal bus bars 20 are shown as two formed channels per phase. For lower current rating, the outer channels are omitted and only one channel per phase is used. To accommodate these various channel arrangements, the side cover member 44 can be configured to provide passage for one or both bus bars of a horizontal bus bar 20 phase as shown in FIG. 2a or 2b or it can be configured for a single channel as illustrated in FIG. 4 or it can be configured as a bus end cover 48 as illustrated in FIG. 6. In the latter instance, the end bus cover 48 may be utilized at the end run of a bus phase.

If additional channel buses are provided in each phase, the overall width of the horizontal bus bars 20 increases. FIG. 2b illustrates a telescoping bus joint cover assembly 30 for a high current (wide) horizontal bus. The horizontal bus in this case is a "thru-bus" which enters one side of the bus joint 25 and exits the other. The cap member 40 of the bus joint cover assembly 30 slides along the guide assemblies 38 to a point where one additional snap slot 36 is defined in the collar member 32. The additional snap slot 36 is linearly aligned with the other snap slot 34. The snap boss 42 formed on the cap member 40 can engage either snap slot 34 or 36 to accommodate the specific width of the channel bus bars 20. A wider side cover member 44, (see FIG. 2b), is installed between the collar member 32 and the cap member 40. A second side cover member 50 is configured to position between the collar member 32 and the cap member 40 and is on the other side of the bus joint cover assembly 30 (see FIG. 5). The bus joint cover assembly 30 can be composed of electrically insulating material. The electrically insulating material is composed of one of a thermoset and thermoplastic material. The parts of the bus joint cover assembly 30, collar member 32, cap member 40 and the side cover members 44, 50 are formed by molding and stamping processes which are well known in the art.

The snap features, snap slot 34 and snap boss 42 on the collar member 32 and cap member 40, make the bus joint cover assembly 30 quick and easy to assemble and disassemble. As shown in FIG. 3, with the cap member 40 removed from the bus joint cover assembly 30, the bus bar joint 25 is exposed allowing access to fasteners 28 to be manipulated. When servicing of the bus bar joint 25 is completed, the cap member 40 is slid onto the collar member 32 by aligning the guide assemblies 38 and engaging the snap boss 42 into a selected snap slot 34, 36.

Figure 5:
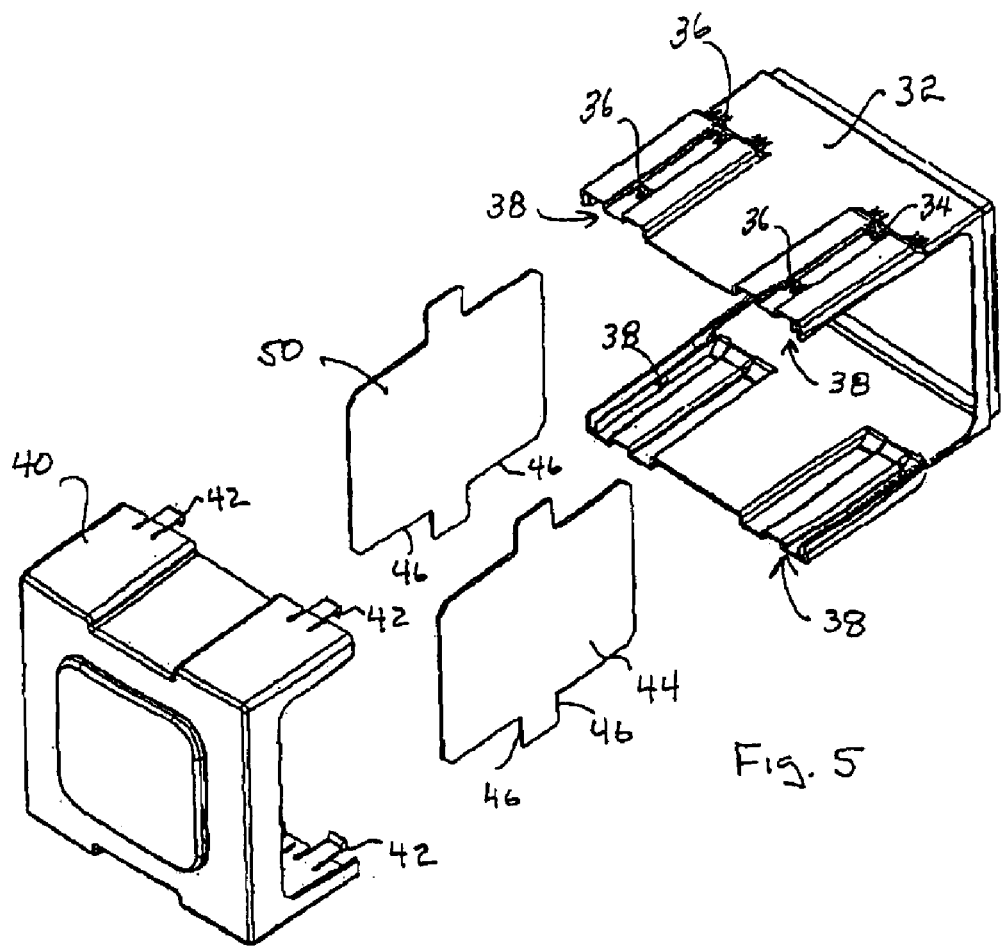
FIG. 5 is an exploded perspective view of an exemplary embodiment of a bus joint cover assembly.

The method for enclosing a bus bar joint 25 in a switch gear assembly 10 is facilitated by the design of the bus joint cover assembly 30. The bus bar joint 25 typically has a back side 26 and a front side 27. The front side 27 of the bus bar joint 25 is typically exposed while servicing equipment within the switchgear assembly 10. The method comprises the steps of providing a collar member 32 with the collar member 32 having a snap slot 34. Then mounting the collar member 32 on the back side 26 of the bus bar joint 25. The mounting of the collar member 32 can be by any convenient and conventional methods such as bolting. The bolts used to assemble the channel bus bars can be utilized to mount the collar member 32. Then providing a cap member 40, with the cap member 40 having a snap boss 32 configured to engage the snap slot 34 of the collar member 32. As illustrated in the figures, particularly FIG. 5, a plurality of snap bosses 42 are formed on the cap member 40. In FIG. 5, three of four snap bosses 42 are shown because of the perspective view. The snap boss 42 can be configured in any convenient and suitable shape as determined by the designer and user of the bus joint cover assembly 30. The method further includes mounting the cap member 40 on the front side 22 of the bus bar joint 25 and joining the cap member 40 and the collar member 32 by coupling the snap boss 42 to the snap slot 34, 36 wherein the bus bar joint 25 is contained within the bus joint cover assembly 30.

The snap slot 34 and the additional snap slots 36 (see FIG. 5) are formed in the collar member 32. The snap slots 34 can be formed during the molding process of the collar member 32 or they can be machined. The snap slot 34 and 36 are configured to engage the snap boss 42. It should be understood that any number of snap slots 34, 36 can be formed or machined in the collar member 32 as determined by the designer or user of the bus bar joint cover assembly 30.

A side cover member 42 is positioned between the collar member 32 and the cap member 40. The side cover member 44 is configured to provide a passage 46 for the bus bars 20. As described above, the side cover member 44 can have different configurations depending on the channel bus bar configuration. As shown in FIG. 6, the side cover member can be configured as a bus end cover 48. It should be noted that scribe lines formed in the side cover member 44 can be utilized to form the passage 46. Scribe lines facilitate the removal of material which can be done in the field or during the manufacturing process.

A typical assembly includes a second side cover member 50 that is positioned between the collar member 32 and the cap member 40 opposite the other side cover member 44. Selecting a material 52 for the bus joint cover assembly 30 is a part of the method and selecting a method includes selecting an electrically insulating material 52 from one of a thermoset and thermoplastic material.

While the embodiments illustrated in the figures and described above are presently disclosed, it should be understood that these embodiments are offered by way of example only. The bus bar cover assembly is not intended to be limited to any particular embodiment, but is intended to extend to various modifications that nevertheless flow within the scope of the intended claim. For example, the bus bar cover assembly can be used on vertical bus bars. The side cover member can be configured to facilitate use with different shaped bus bars. Other modifications will be evident to those will ordinary skill in the art.

What is claimed is:

1. A bus joint cover assembly for use in switchgear equipment having bus bars joined together at a bus joint, the bus joint cover assembly comprising:
   a collar member having a snap slot; and
   a cap member having a snap boss configured to engage the snap slot, with the cap member configured to telescopically join with the collar member around the bus joint wherein the bus joint is contained within the bus joint cover assembly.

2. The bus joint cover assembly of claim 1, with at least one additional snap slot defined in the collar member, the additional slot linearly aligned with the other snap slot, wherein the snap boss can engage either snap slot.

3. The bus joint cover assembly of claim 1, including a side cover member configured to position between the collar member and cap member.

4. The bus joint cover assembly of claim 3, wherein the side cover member is further configured to provide a passage for the bus bars.

5. The bus joint cover assembly of claim 3, wherein the side cover member is further configured as a bus end cover.

6. The bus joint cover assembly of claim 3, including a second side cover member configured to position between the collar member and cap member.

7. The bus joint cover assembly of claim 1, wherein the bus joint cover assembly is composed of electrically insulating material.

8. The bus joint cover assembly of claim 7, wherein the electrically insulating material is composed of one of a thermoset and thermoplastic material.

9. A bus joint cover assembly for use in switchgear equipment having bus bars joined together at a bus joint, the bus joint cover assembly comprising:
   a collar member;
   a cap member; and
   a means for telescopically joining with the cap member and collar member around the bus joint wherein the bus joint is contained within the bus joint cover assembly.

10. The bus joint cover assembly of claim 9, including a side cover member configured to position between the collar member and cap member.

11. The bus joint cover assembly of claim 10, wherein the side cover member is further configured to provide a passage for the bus bars.

12. The bus joint cover assembly of claim 10, wherein the side cover member is further configured as a bus end cover.

13. The bus joint cover assembly of claim 10, including a second side cover member configured to position between the collar member and cap member.

14. The bus joint cover assembly of claim 9, wherein the bus joint cover assembly is composed of one of a thermoset and thermoplastic material and is an electrically insulating material.

15. A method of enclosing a bus bar joint in a switchgear assembly with a bus joint cover assembly, with the bus joint having a back side and a front side, the method comprising the steps of:
   providing a collar member, with the collar member having a snap slot;
   mounting the collar member on the back side of the bus bar joint;
   providing a cap member, with the cap member having a snap boss configured to engage the snap slot;
   mounting the cap member on the front side of the bus bar joint; and
   joining the cap member and the collar member by coupling the snap boss to the snap slot, wherein the bus bar joint is contained within the bus joint cover assembly.

16. The method of claim 15, wherein the collar member includes at least one additional snap slot, and the step of joining the cap member and collar member includes engaging any snap slot.

17. The method of claim 15, including the steps of providing a side cover member and positioning the side cover member between the collar member and cap member.

18. The method of claim 17, including the step of configuring the side cover member to provide a passage for the bus bars.

19. The method of claim 17, including the step of configuring the side cover member as a bus end cover.

20. The method of claim 17, including the step of providing a second side cover member and positioning the second side cover member between the collar member and cap member.

21. The method of claim 15, including the step of selecting a material for the bus joint cover assembly.

22. The method of claim 21, wherein the step of selecting a material includes selecting an electrically insulating material from of one of a thermoset and thermoplastic material.

* * * * *